US011541704B2

(12) United States Patent
Helmeczi et al.

(10) Patent No.: US 11,541,704 B2
(45) Date of Patent: Jan. 3, 2023

(54) HIGH ARTICULATING IMPLEMENT HITCH

(71) Applicant: Bridgeview Mfg. Inc., Gerald (CA)

(72) Inventors: Raymond Helmeczi, Esterhazy (CA); James Kowch, Churchbridge (CA)

(73) Assignee: Bridgeview Mfg. Inc., Gerald (CA)

( * ) Notice: Subject to any disclaimer, the term of this patent is extended or adjusted under 35 U.S.C. 154(b) by 193 days.

(21) Appl. No.: 16/875,098

(22) Filed: May 15, 2020

(65) Prior Publication Data

US 2020/0361257 A1 Nov. 19, 2020

Related U.S. Application Data

(60) Provisional application No. 62/848,105, filed on May 15, 2019.

(51) Int. Cl.

| *B60D 1/07* | (2006.01) |
| *B60D 1/167* | (2006.01) |
| *B60D 1/24* | (2006.01) |
| *B60D 1/06* | (2006.01) |
| *B60D 1/02* | (2006.01) |

(52) U.S. Cl.
CPC ............... *B60D 1/07* (2013.01); *B60D 1/02* (2013.01); *B60D 1/065* (2013.01); *B60D 1/167* (2013.01); *B60D 1/247* (2013.01)

(58) Field of Classification Search
CPC . B60D 1/07; B60D 1/02; B60D 1/065; B60D 1/167; B60D 1/247; B60D 2001/008; A01B 59/002; A01B 59/004; A01B 59/006; A01B 59/008; A01B 59/042
See application file for complete search history.

(56) References Cited

U.S. PATENT DOCUMENTS

| 3,342,509 A | * | 9/1967 | Sancioni | B60D 1/167 |
| | | | | 280/489 |
| 3,362,728 A | * | 1/1968 | Wing | B60D 1/065 |
| | | | | 280/512 |
| 5,941,551 A | * | 8/1999 | Harman | B60D 1/02 |
| | | | | 280/477 |
| 6,502,847 B1 | * | 1/2003 | Greaves | B60D 1/00 |
| | | | | 280/491.1 |
| 7,584,984 B1 | * | 9/2009 | Williams, Jr. | B60D 1/00 |
| | | | | 280/478.1 |
| 7,748,548 B1 | * | 7/2010 | Ragsdale, Sr. | B60D 1/46 |
| | | | | 213/75 R |
| 8,662,520 B1 | * | 3/2014 | Powers | B60D 1/04 |
| | | | | 280/416.1 |

(Continued)

*Primary Examiner* — Jacob D Knutson
*Assistant Examiner* — Abigail R Hymel
(74) *Attorney, Agent, or Firm* — McNees Wallace & Nurick LLC

(57) ABSTRACT

A hitch is provided including a tongue, an insert, and a base. The tongue includes a C-shaped section having an internal spherical raceway and opposing walls, each extending from an opposite arm of the C-shaped section. The insert includes a spherical segment received within the internal spherical raceway and having a draw pin hole, and a projection extending rearward between the opposite arms of the C-shaped section and having a socket recess. The base being pivotally connected to the tongue through the opposing walls. The base includes a ball located in front of the pivotal connection, the ball being received within the socket recess of the insert, and a back end being adapted for connection to a towing implement.

19 Claims, 10 Drawing Sheets

(56) References Cited

U.S. PATENT DOCUMENTS

| | | | |
|---|---|---|---|
| 2002/0168122 A1* | 11/2002 | Kletzli | B60D 1/141 |
| | | | 384/192 |
| 2003/0141085 A1* | 7/2003 | Paluch | A01B 73/005 |
| | | | 172/679 |
| 2007/0014497 A1* | 1/2007 | Wood | A01B 59/008 |
| | | | 384/192 |
| 2012/0151892 A1* | 6/2012 | Clark | B60D 1/145 |
| | | | 56/15.7 |
| 2014/0346755 A1* | 11/2014 | Svihla | B60D 1/06 |
| | | | 280/495 |
| 2015/0334910 A1* | 11/2015 | Treffer | A01B 71/066 |
| | | | 280/494 |
| 2016/0229243 A1* | 8/2016 | Wagner | F16C 33/74 |
| 2017/0332542 A1* | 11/2017 | Garcia | B60D 1/50 |

* cited by examiner

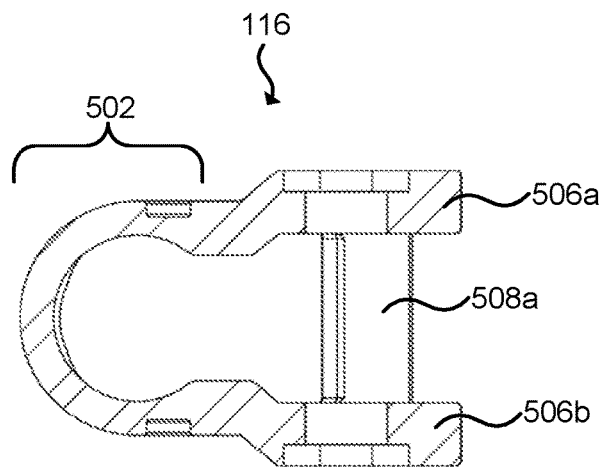
FIG. 5A
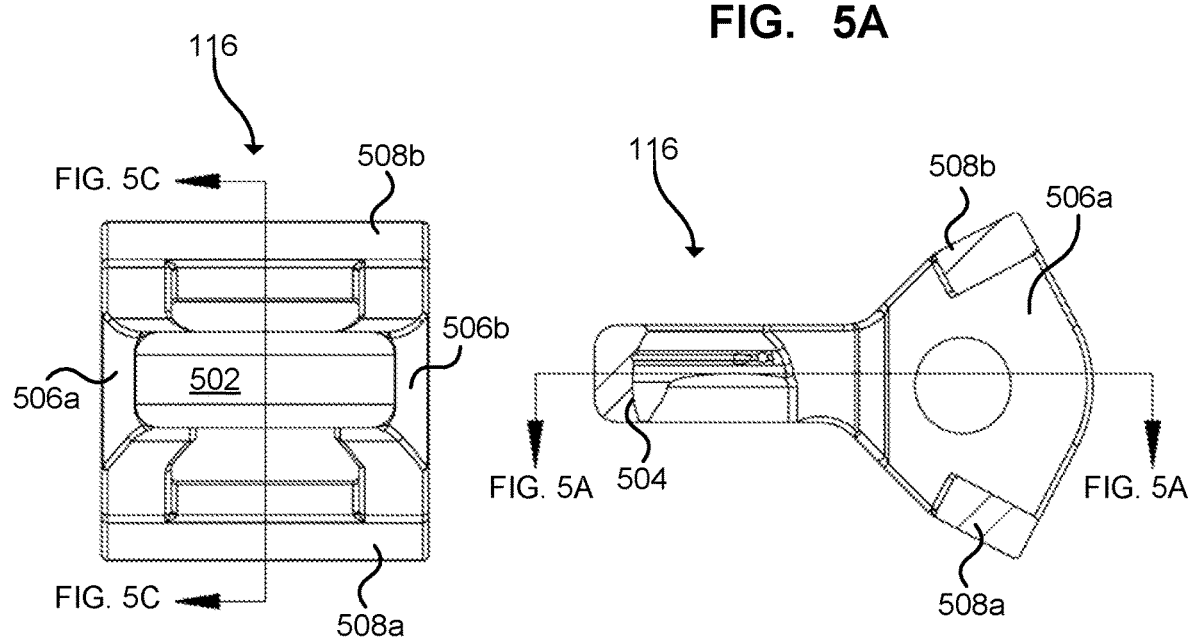
FIG. 5B
FIG. 5C

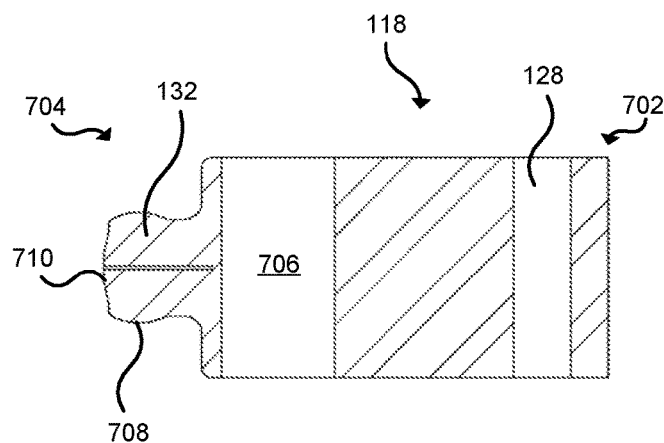
FIG. 7A
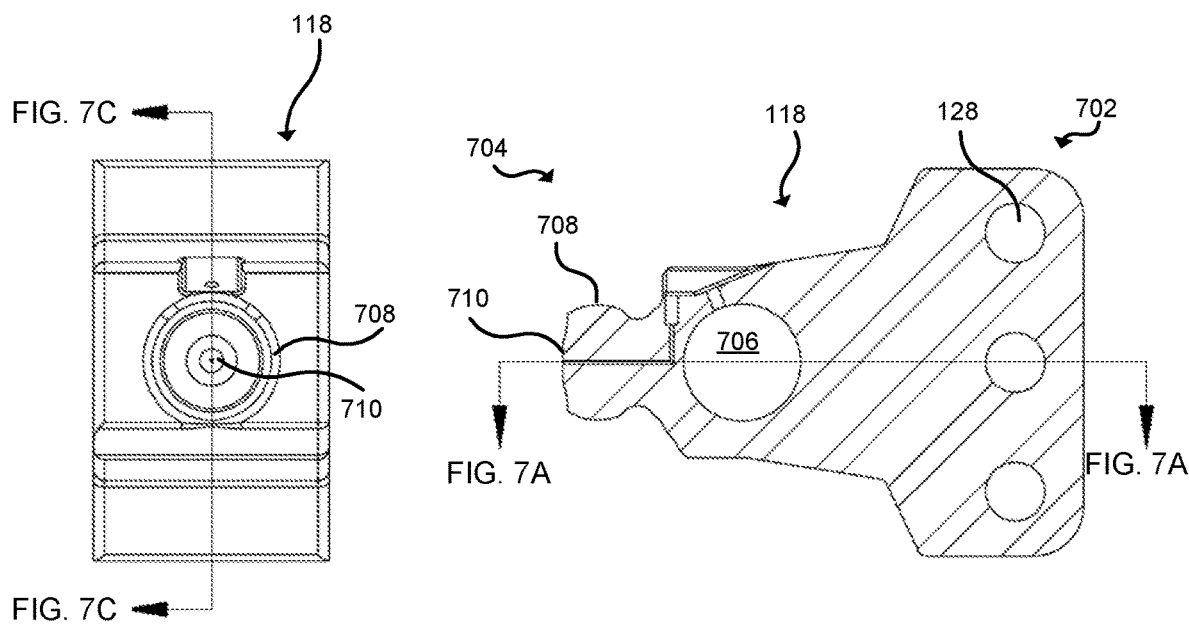
FIG. 7B
FIG. 7C

HIGH ARTICULATING IMPLEMENT HITCH

RELATED APPLICATIONS

The current application claims priority to U.S. Provisional Application 62/848,105 filed on May 15, 2019, the entire contents of which are incorporated herein by reference in their entirety.

TECHNICAL FIELD

The current disclosure relates to an implement hitch and in particular an implement hitch assembly for connecting an implement to a tow vehicle.

BACKGROUND

Implement hitches are commonly used to connect a towed implement to a tractor or tow vehicle. A hitch can be secured to the implement and connected to a draw bar on a tow vehicle via a draw pin. The hitch should provide sufficient articulation to allow movement of the towed implement as it is towed. If the hitch is not able to provide enough range of motion between the tow vehicle and implement, damage may occur to the vehicle, draw bar, hitch and/or implement.

Various hitch designs exist that provide various degrees of articulation. However, hitches capable of high articulation are often complex and expensive, while simple hitches provide limited range of motion or suffer other issues such as excessive backlash.

Accordingly, an additional, alternative and/or improved articulating hitch is desirable.

BRIEF DESCRIPTION OF DRAWINGS

Further features and advantages of the present disclosure will become apparent from the following detailed description, taken in combination with the appended drawings, in which:

FIG. 4B depicts an exploded view of the hitch of FIG. 4a;

FIGS. 5A-5C depict details of the tongue;

FIGS. 7A-7C depict details of the articulating tongue base;

DETAILED DESCRIPTION

Figure 1:
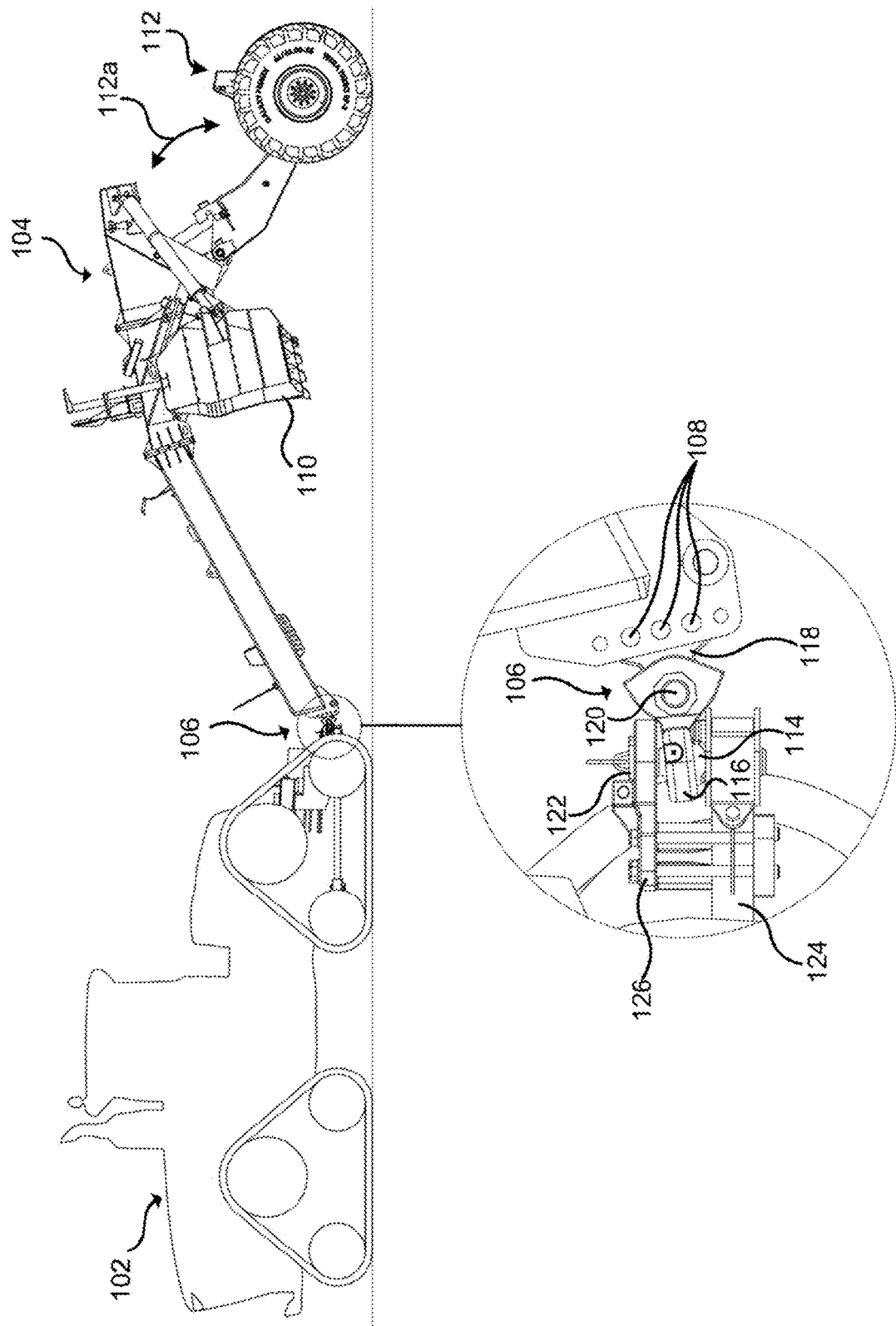
FIG. 1 depicts a tow vehicle with an attached towed implement.

In accordance with the present disclosure, there is provided a hitch comprising: a tongue; an insert received within the tongue, the insert having a through-hole for a draw pin; and a base with an implement connection, the base pivotally coupled to the tongue and moveably coupled to the insert.

In a further embodiment of the hitch, the tongue comprises: a section having an internal spherical raceway; and opposing walls each extending from opposite sides of the section.

In a further embodiment of the hitch, the section of the tongue is C-shaped and the opposing walls extend from opposite arms of the C-shape.

In a further embodiment of the hitch, the insert comprises: a spherical segment received within the internal spherical raceway of the tongue; and a projection extending rearward between the opposite sides of the section and having a socket recess.

In a further embodiment of the hitch, the base comprises: a ball located in front of the pivotal connection to the tongue, the ball being received within the socket recess of the insert; and a back end being adapted for connection to a towing implement.

In a further embodiment of the hitch, at least a portion of the ball remains in contact with at least a portion of the socket recess throughout movement of the base relative to the tongue.

In a further embodiment of the hitch, the socket recess has a generally hemi-spherical shape.

In a further embodiment of the hitch, a middle portion of a bottom surface of the hem i-spherical socket recess is raised and has a flat top.

In a further embodiment of the hitch, the base is pivotally connected through the opposing walls via a pin.

In a further embodiment of the hitch, the pin is slidingly received by an opening in each of the opposing walls.

In a further embodiment of the hitch, the pin is secured at a side of each of the opposing walls.

In a further embodiment of the hitch, the implement connection of the base comprises one or more bolt holes.

In a further embodiment of the hitch, the implement connection of the base comprises a rotatable connection.

In a further embodiment of the hitch, the rotatable connection comprises a circular projection at a back end of the base and at least two sections secured about the circular projection, the two clamp sections when secured about the circular projection having a back end comprising one or more bolt holes for connecting the towing implement.

In a further embodiment of the hitch, the at least two clamps are secured together with bolts.

In a further embodiment of the hitch, the through hole of the insert is sized to slidingly receive a draw pin for connecting the hitch to a drawbar.

In a further embodiment of the hitch, when in use, the insert rests on a draw bar of a tow vehicle and a force of the towing implement is transferred to a drawbar through the moveable coupling between the base and the insert.

In a further embodiment, the hitch comprises a plurality of grease connections arranged to supply lubricant to movable connections.

In accordance with the present disclosure, there is further provided a towing implement comprising: a frame; a working component coupled to the frame; and a hitch apparatus connected to the frame for connecting the towing implement to a tow vehicle.

A high articulation hitch provides a wide range of movement between a tow vehicle and towed implement without risk, or at least with a reduced risk, of damaging components compared to similar style of hitches without improved articulation ranges. In particular, the hitch provides additional articulation for vertical movement of a towed implement via a pivoting connection between a tongue and articulating tongue base. The tongue has an insert with a spherical shape that allows the tongue to move around the insert freely within a limited range. A draw pin is inserted through the insert and secures the hitch to a drawbar of the tow vehicle. The spherical connection between the insert and tongue provides a first range of articulation between the tow vehicle and the tongue. The articulation range of the hitch is further extended by the pivotal connection between the tongue and the articulating tongue base, which is coupled to the towed implement. In order to transfer a vertical load of the towed implement to the drawbar, and so reduce the risk of damage, the articulating tongue base is also connected to the insert via a ball and socket type connection. The pivotal connection between the tongue and articulating tongue base provides a greater range of articulation, while the connection between the articulating tongue base and the insert helps to transfer vertical loads to the drawbar, which can help reduce wear and tear on the hitch as well as reducing a risk of damage to components of the hitch, tow vehicle and towed implement.

FIG. 1 depicts a tow vehicle and towed implement connected through a hitch. The tow vehicle 102 is depicted as a quad track agricultural tractor, although other tow vehicles are possible. The hitch described further below may be used in high horsepower applications, such as with tractors having horsepower of between 600 hp and 1000 hp. It will be appreciated that the hitch may be used in lower horsepower applications as well. The tow vehicle 102 is capable of towing implements 104, such as a scraper that can be used to shape the ground, clear snow, move earth, etc. It will be appreciated that the implement 104 may be any other type of implement that is towed behind a vehicle, including for example, wagons, carts, spreaders, rakes, etc. The implement 104 is physically coupled to the tow vehicle using a hitch 106. The hitch 106 is fixed at one end to the towed implement 104, for example using one or more bolts 108 as depicted, although the hitch 106 could be welded to, formed with or otherwise fixed to the implement 104. As will be appreciated, as the implement moves vertically relative to the tow vehicle, for example as a result of travelling over uneven ground or raising or lowering the implement, the angle between the drawbar of the tow vehicle and the implement will change. For example the scraper blade 110 of the implement 104 may be raised or lowered by raising or lowering the wheels 112, depicted by arrow 112*a*. By raising or lowering the wheels 112, the angle between the implement 104 and drawbar of the tow vehicle 102 changes as well. The hitch 106 must be able to articulate across the possible range of motion. If the hitch cannot articulate across the full range, the hitch may be damaged. For example, the hitch may be levered upwards, or downwards possibly causing damage to the drawbar, draw pin or other components.

Figure 2:
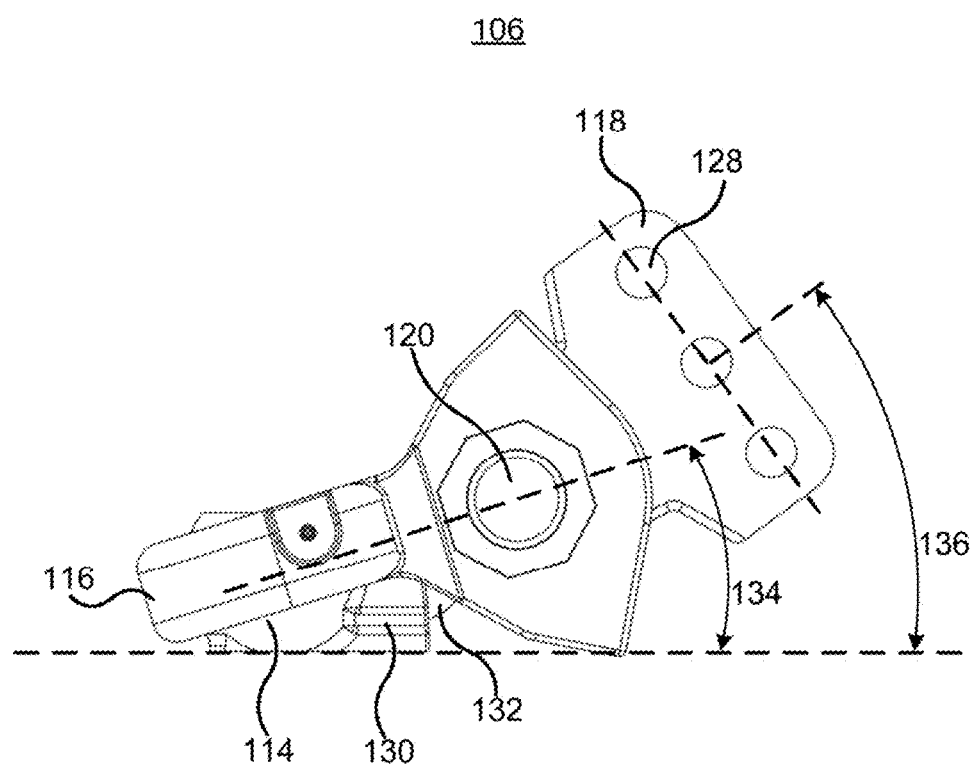
FIG. 2 depicts the hitch of FIG. 1.

The hitch 106, which is depicted in isolation in FIG. 2, comprises an insert 114, a tongue 116, and an articulated tongue base 118. The insert 114 is received within the tongue 116 and may be a ball insert that has a pin hole passing therethrough. The pin hole of the insert is sized to receive a draw pin 122 that secures the hitch 106 to a drawbar 124 of the tow vehicle 102. The drawbar 124 may include an upper member 126, which may be referred to as a hammer strap, secured to the drawbar 124 for example by bolts or welding. The drawbar 124, and hammer strap 126 if present, may have holes that are vertically aligned and sized to receive the draw pin 122. The drawbar 124 is sized to handle the load requirements of the towed implement 104 and power of the tow vehicle 102. For example, for high horsepower applications, the draw pin 122 may be a Category 5 draw pin that has a 2.75" diameter. It will be appreciated that larger diameter draw pins may be used with smaller horsepower applications. Further, the hitch may be designed to use smaller draw pins, such as Category 4 or Category 3 draw pins. Additionally or alternatively, additional bushings or stepped draw pins may be used to adapt a hitch for use with different sized pins. For example an adapter bushing may be used to adapt a Category 5 hitch for use with a Category 4 draw pin. The hitch 106 can secure the towed implement 104 to the tow vehicle by inserting the draw pin 122 through the hole of the hammer strap 126, through the pin hole of the insert 114 and through the hole of the drawbar 124. The draw pin 122 secures the insert to the drawbar 124 and may have a close fit that limits movement of the insert 114 to rotating about the draw pin 122.

The ball shape of the insert 114 allows the tongue 116 to move freely about the insert 114, although within a limited range. The articulated tongue base 118 is pivotally connected to the tongue 116 by a pivot pin 120. The pivotal connection between the tongue 116 and articulated tongue base 118 provides additional range of motion for vertical movement of the towed implement 104 relative to the tow vehicle 102. In addition to the pivotal connection between the articulated tongue base and the tongue 116, the articulating tongue base 118 is also coupled to the insert within the tongue 116 via a ball and socket type connection. The connection between the articulating tongue base 118 and the insert 114 ensures that the insert 114 remains sitting on the drawbar 124 to transfer the vertical load of the implement directly to the drawbar 124.

FIG. 2 depicts the hitch 106 of FIG. 1 in isolation. As depicted in FIG. 2, the hitch 106 comprises a spherical insert 114 that is received with the tongue 116. The spherical insert 114 is received within an internal spherical raceway of the tongue 116 that allows the tongue to move about the insert while the insert remains stationary. The spherical insert 114 provides a first range of vertical articulation while the insert is connected to the drawbar via a draw bar pin. The articulation range provided by the spherical connection between the insert 114 and the tongue 116 is depicted by arrow 134. To provide additional articulation, rather than having the tongue 116 being connected to the towed implement, the tongue 116 is connected to an articulating tongue base 118. The articulating tongue base 118 is pivotally connected to the tongue 116 by a pivot pin 120. The articulating tongue base 118 is adapted at one end to be coupled to the towed implement. For example, in order to connect the hitch 106 to a towed implement, the end of the articulating tongue base 118 may comprise a plurality of bolt holes 128 that allows the articulating tongue base 118 to be securely connected to the towed implement 104. The pivotal connection between the tongue 116 and the articulating tongue base 118 provides additional vertical articulation, depicted by arrow 136, between the tow vehicle 102 and towed implement 104.

In addition to the pivot pin connection 120, between the articulating tongue base 118 and the tongue 116, the articulating tongue base 118 is connected to the insert 114. The articulating tongue base 118 may be connected to the insert 114 via a ball and socket type connection. As depicted, the insert 114 may have a projection 130 into which a socket may be formed. The articulating tongue base 118 has a ball 132 formed in front of the pivotal connection that is received within the socket recess 130 of the insert 114. Connecting the articulating tongue base 118 to the insert 114 helps to transfer the implement load to the drawbar through the insert. While the connection between the insert and the articulating tongue base limits the vertical articulation, without the connection, the vertical load of the implement would result in a large leveraging moment at the pivot pin connection 120. By connecting the articulating tongue base 118 to the insert, the load of the tow implement is transferred through the insert 114 onto the drawbar, which is designed to handle the weight.

Figure 3:
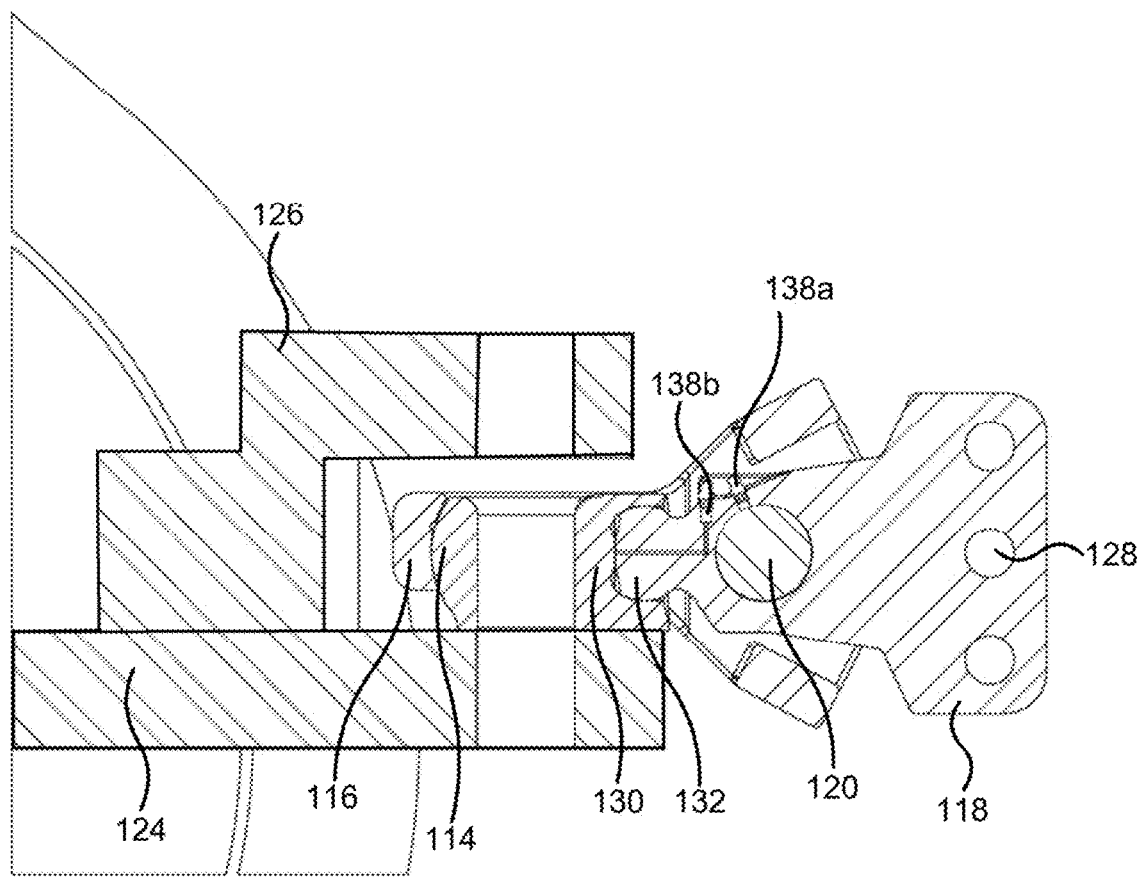
FIG. 3 depicts a cross-sectional view of the hitch on a drawbar.

FIG. 3 depicts a cross-sectional view of the hitch on a drawbar. The hitch 106 comprises an insert 114 that sits on a drawbar 124. A hammer strap 126 may be connected to the drawbar 124 and holes of the hammer strap and drawbar may be vertically aligned to receive a draw pin and secure the hitch to the drawbar. The insert 114 has a hole that receives the draw pin. The insert 114 has a spherical section that is received within a spherical raceway of the tongue 116 that allows the insert to move within the tongue 116. The insert 114 also includes a projection 130 that has a socket recess formed within it.

The tongue 116 is pivotally connected to the articulating tongue base 118 by a pivot pin 120. The articulating tongue base 118 has a ball 132 formed at one end. The ball 132 is received by the socket formed within the projection of the insert 114 and connects the articulating tongue base 118 to the insert 114. The ball 132 is located in front of the pivot connection. A back end of the articulating tongue base 118 is configured for coupling to the towed implement. The back end may have a vertical plate section with bolt holes 128 as depicted although other arrangements for coupling the hitch to the towed implement are possible.

The hitch 106 comprises a plurality of moving connections. As depicted, there is the spherical connection between the tongue 116 and insert 114, the ball and socket connection between the insert 114 and articulating tongue base 118 and the pivotal connection between the tongue 116 and the articulating tongue base 118. The hitch may include passage ways and fittings 138a, 138b depicted for the ball and socket connection and the pivotal connection, for greasing or lubricating the moving connections. The fittings may be a grease nipple, Zerk fitting, Alemite fitting or any other suitable type of connection for facilitating the greasing of the moving components.

Figure 4A:
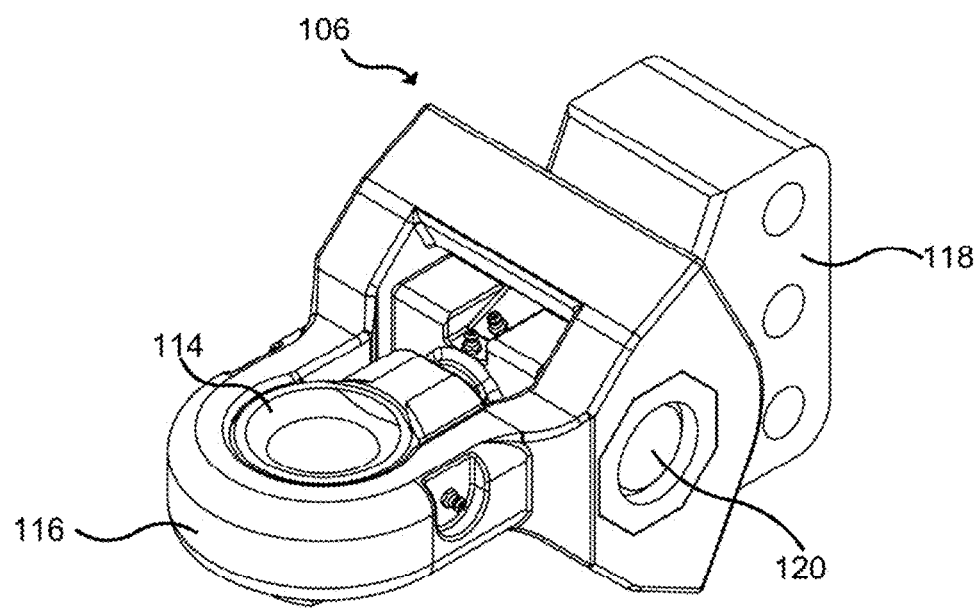
FIG. 4A depicts an assembled hitch.
Figure 4B:
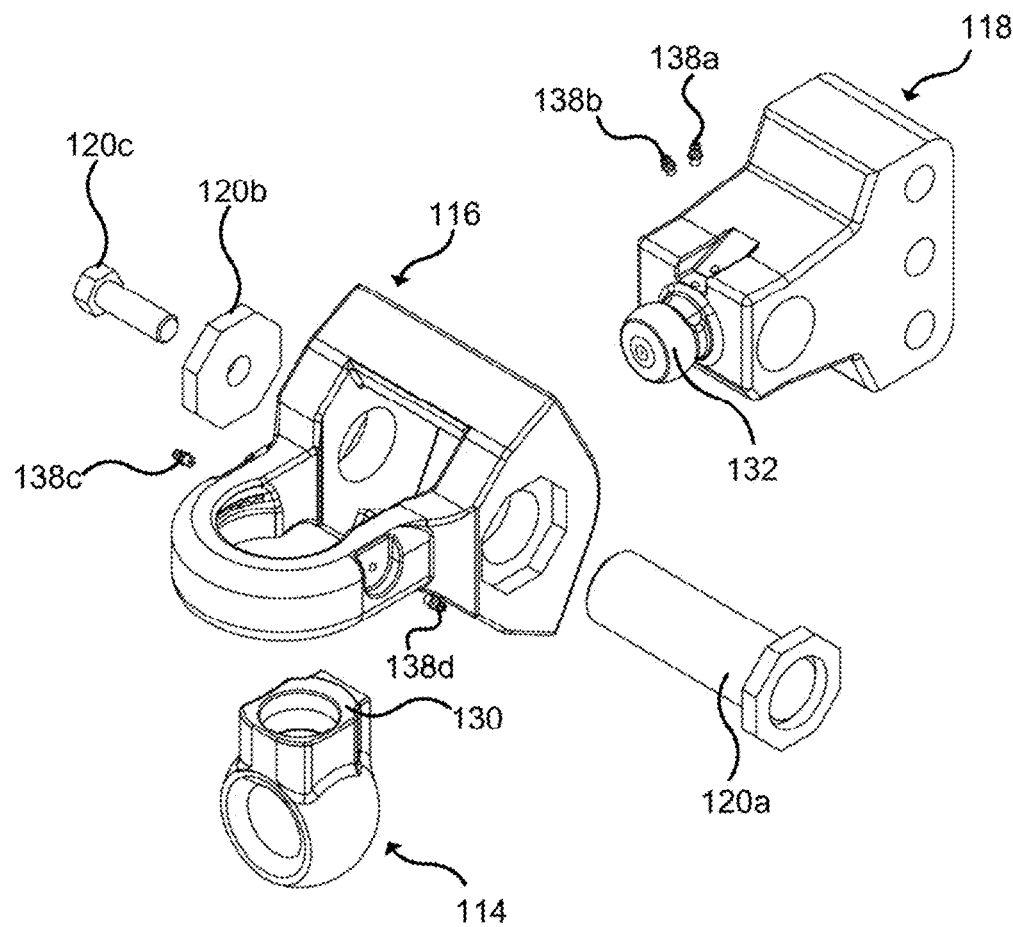

FIG. 4A depicts the assembled hitch of FIGS. 1 to 3. FIG. 4B depicts an exploded view of the hitch of FIGS. 1 to 3. As described above, the hitch 106 comprises an insert 114 that is received with a tongue 116. An articulating tongue base 118 is pivotally connected to the tongue 116 by a pivot pin 120. A ball and socket type connection connects the articulating tongue base 118 to the insert 114. The insert 114 may be inserted into the tongue 116 from a bottom and rotated 90 degrees into position, although other ways of assembling the insert and tongue are possible. The insert has a projection 130 in which a socket is formed. The socket of the insert receives a ball 132 that is formed on the articulating tongue base 118 in front of a pivot pin hole. The articulating tongue base 118 is pivotally connected to the tongue 116 by a pivot pin comprising a main pin 120a that may have a head formed on one end to prevent the pin from passing all the way through the pivot pin holes formed in the tongue 116 and articulating tongue base 118. A washer 120b and bolt 120c may be used to secure the main pivot pin in place. The head of the main pin 120a and the washer 120b may have a hexagonal shape that are received within correspondingly shaped recesses. The hexagonal shape prevent the rotation of the main pin 120a and washer 120b relative to the tongue 116. It will be appreciated that other means of securing the pivot pin once inserted through the pivot pin holes may be used. A number of grease fittings 138a, 138b, 138c, 138d may be connected to respective passages for supplying grease or lubricant to moveable components.

FIGS. 5A to 5C depict details of the tongue. In particular, FIG. 5A depicts a top cross-sectional view of the tongue 116, FIG. 5B depicts a front view of the tongue 116, and FIG. 5C depicts a side cross-sectional view of the tongue 116. As depicted in FIG. 5A, the tongue 116 may have a C-shaped front section 502. The C-shaped section 502 has an internal raceway 504 (most clearly depicted in FIG. 5C) that is spherical in shape and receives the insert as described above. The internal raceway does not form a complete circle and has an opening that allows the projection of the insert to extend rearward. The internal raceway 504 and insert provide a spherical bearing that allows the insert to rotate within the internal spherical raceway. Although described as having a C-shape, it will be appreciated that the internal spherical raceway may be formed within other shapes. The tongue 116 comprises a pair of arms 506a, 506b that extend from the ends of the C-shaped section 502. The arms 506a, 506b may extend parallel to each other so that the C-shape is elongated. The arms 506a, 506b may be connected to each other at a top and a bottom of the arms by respective bridging sections 508a, 508b. The bridging material 508a, 508b connect the arms together to provide additional strength and rigidity. The bridging material 508a, 508b connecting the arms 506a, 506b together may further prevent the articulating tongue base from rotating too far above or below the tongue 116.

Figure 6A:
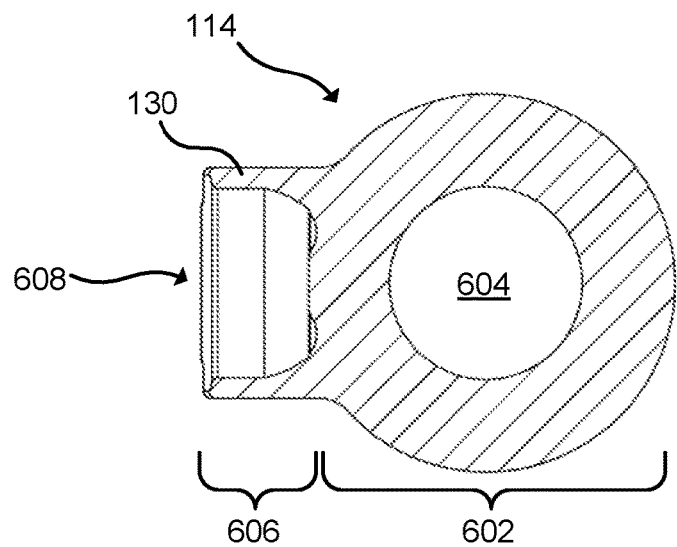
FIGS. 6A-6C depict details of the insert.
Figures 6B, 6C:
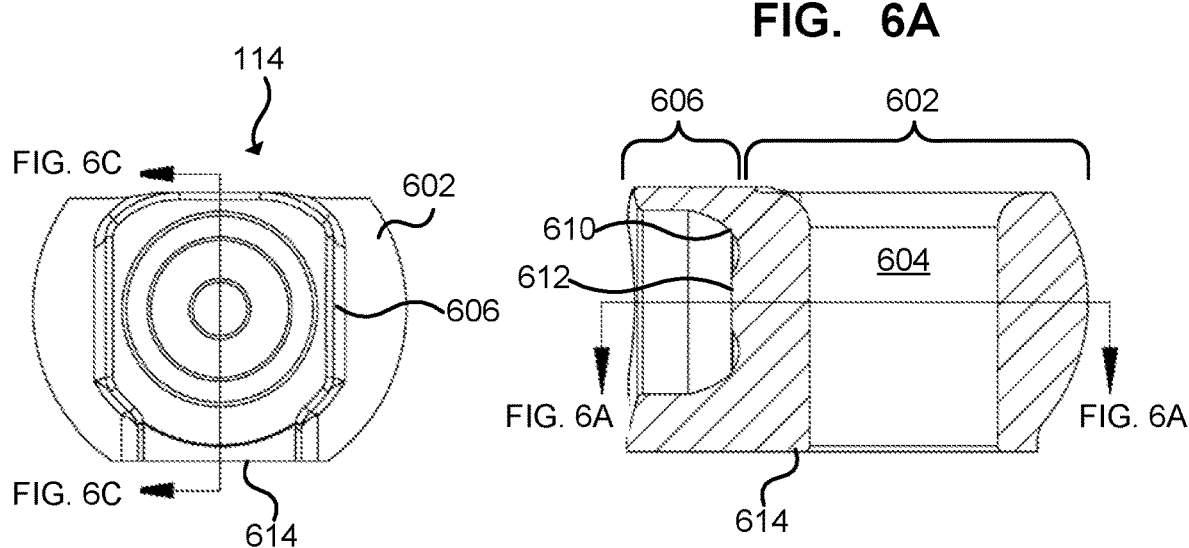

FIGS. 6A to 6C depict details of the insert. In particular, FIG. 6A depicts a top cross-sectional view of the insert 114, FIG. 6B depicts a back view of the insert 114, and FIG. 6C depicts a side cross-sectional view of the insert 114. As described above, the insert 114 may comprise a spherical segment 602 that is received within the internal spherical raceway of the tongue 116. A through-hole 604 is formed through the center of the spherical section 602 of the insert 114 and is sized to receive a draw pin. The insert 114 further comprises a projection 606 that extends from the spherical section 602 generally perpendicular to the through-hole 604. The through-hole 604 may have an enlarged opening at the top side, or the side that typically receives the draw pin, in order to facilitate the insertion of the draw pin into the through-hole 604. The projection 606 has a recess 608 formed in it that is shaped to receive a correspondingly shaped projection of an articulating tongue base to provide a ball and socket type connection. The recess 608 may have a generally hemi-spherical shape 610 that may have a raised flatten section 612. The raised flatten section 612 may be located at the deepest part of the recess 608. The raised flatten sections 612 may be located in the center of the recess and located coaxially with an imaginary axis that is perpendicular to the through-hole 604 and passes through the center of the recess 608. The insert 114 may have a generally flat bottom surface 614 that rests on a drawbar when attached to a tow vehicle.

FIGS. 7A to 7C depict details of am articulating tongue base. In particular, FIG. 7A depicts a top cross-sectional view of the articulating tongue base 118, FIG. 7B depicts a front view of the articulating tongue base 118, and FIG. 7C depicts a side cross-sectional view of the articulating tongue base 118. The articulating tongue base 118 is sized to be received between the opposing side walls 506a, 506b of the tongue 116. As described above, the articulating tongue base 116 may comprise a back section 702 that is adapted to be secured to a towed implement. For example, the back section 702 may have one or more bolt holes 128 formed there through for bolting the hitch to the implement. The articulating tongue base 118 comprises front section 704 with a through-hole 706 formed through the base for receiving the pivot pin. The pivot through-hole 706 is located between the back section 702 and the ball 132. The ball 132 is formed at the front section 704 and has a corresponding shape to the recess of the insert. The ball 132 is depicted as having a spherical portion 708 with a flattened front area 710. The shape of the ball 132 and recess of the insert correspond to each and contact each other in order to transfer weight from the towed implement to the drawbar. Further the shape of the ball 132 and recess, and in particular the flatten portions thereof as depicted, may reduce backlash between the insert and articulating tongue base 118. For example, if the ball 132 were completely spherical, as the articulating tongue base rotated about the pivot pin, the ball 132 would be pulled backwards relative to the tongue and since the insert to which the ball is connected is held in place within the tongue, the recess in the insert would need to be formed to allow this movement, which could cause undesirable backlash. Alternatively, if the recess were not formed with sufficient tolerances for the additional movement, the insert could be pulled backwards relative to the tongue and could be displaced from the spherical internal raceway. The raised bottom of the recess and corresponding flat portion of the ball allow the articulating tongue base to rotate about the pivot pin while maintaining contact and eliminating backlash between the ball and recess.

The components of the high articulating hitch such as those described above with reference to FIGS. 5A to 7C may be manufactured using various techniques. The components may be made from a forged or cast material that has been machined to provide matching surfaces. The materials used may vary depending upon the desired strength characteristics of the hitch, and may include, for example, ductile iron, cast iron, steel, stainless steel, etc. The various components may be made from the same material, or from different materials. For example, the tongue and articulating tongue base may be made from a forged steel material that has been machined while the insert may be machined from stainless steel. The materials may be further treated for additional strength, for example by heat treating, or other processes including for example painting or coating. It will be readily apparent that the materials and processes used in manufacturing the hitch may be varied based on factors such as the desired application, cost, strength, availability of resources, etc.

Figure 8A:
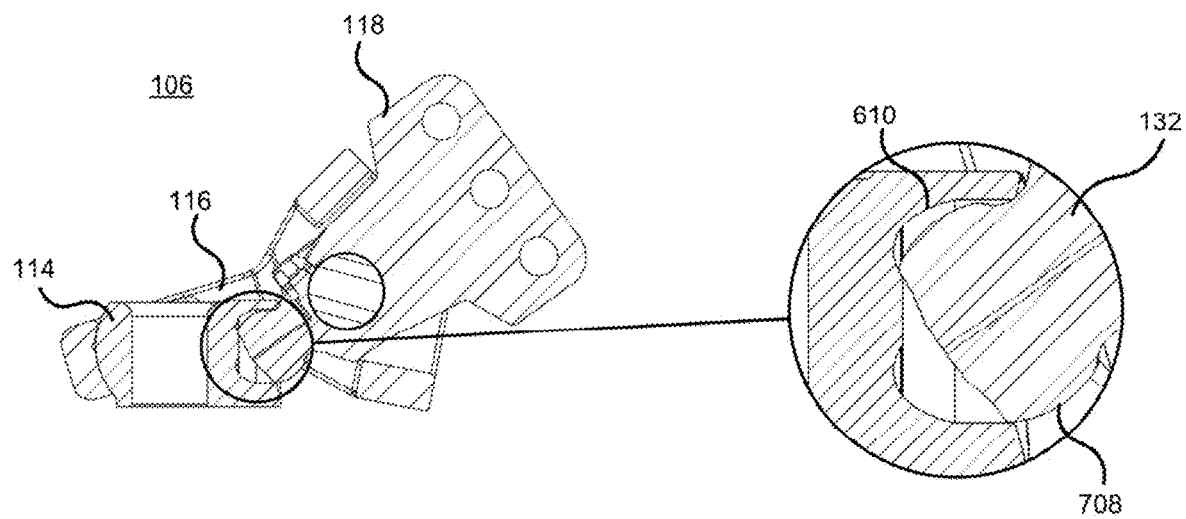
FIGS. 8A-8C depict the vertical movement of the hitch from the connection of the insert and the base.
Figure 8B:
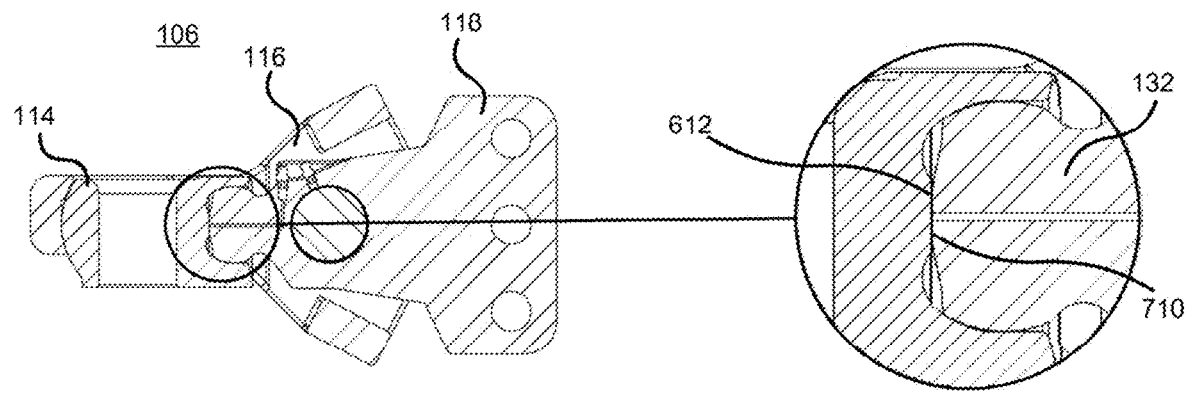
Figure 8C:
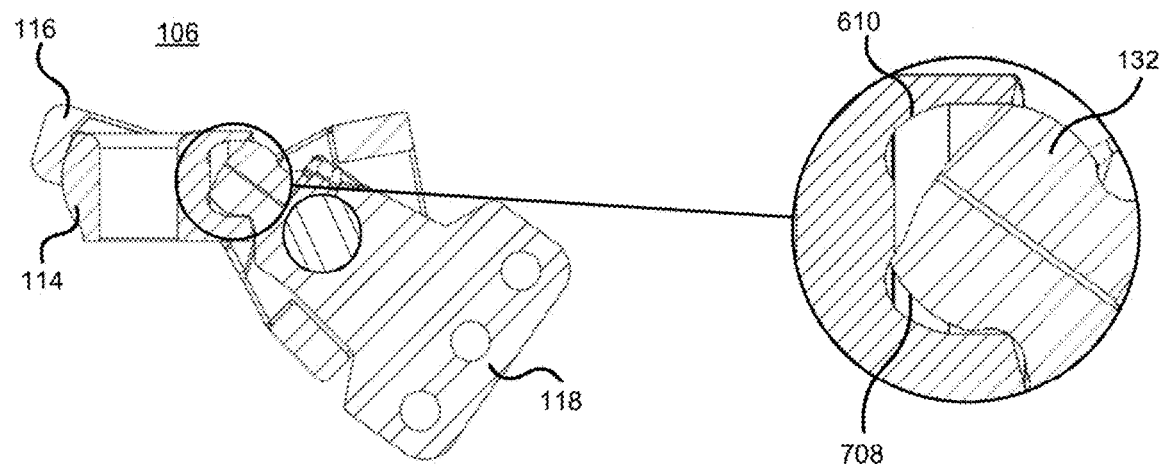

FIGS. 8A 8C depict cross sections of the high articulating hitch at different ranges of articulation. FIG. 8A depicts the hitch at a maximum range of upward movement of the towed implement. FIG. 8B depicts the hitch 106 in a neutral or level position. FIG. 8C depicts the hitch at a maximum range of downward movement of the towed implement. As depicted in each of FIGS. 8A to 8C, the ball 132 of the articulating base 118 remains in contact with the socket of the projection of the insert 114. The spherical section 708 of the ball may remain in contact with the corresponding spherical portion of the 610 of the recess through the full range of articulation. The flattened portion 710 of the ball 132 and the flattened portion 612 of the recess of the insert 114 may be in contact with each other when the hitch is in the neutral position depicted in FIG. 8B. The particular shape of the ball and socket described above are believed to provide sufficient strength to transfer the vertical load of the towed implement to the draw bar while being easy to manufacture and still providing acceptable tolerances between the components to provide acceptable backlash. As will be appreciated, excessive backlash can cause excessive wear and possible damage to the hitch, the towed implement, and/or the towed vehicle.

As depicted the ball and socket connection provide at least two areas of contact, when viewed in the cross section views depicted in FIGS. 8A to 8C. The at least two contact points of the ball 132 and the socket recess of the socket are present when implement, such as implement arm 112 depicted in FIG. 1, connected to the back of the hitch 106 is at any angle, within the extended articulation range. The at least two contact points allow the implement load to be transferred from the implement to the ball of the articulating tongue base, to the projection of the insert, and to the drawbar. The generally flat surface shape of the ball and of the socket recess may accommodate any backlash that the hitch 106 may undergo.

Figure 9A:
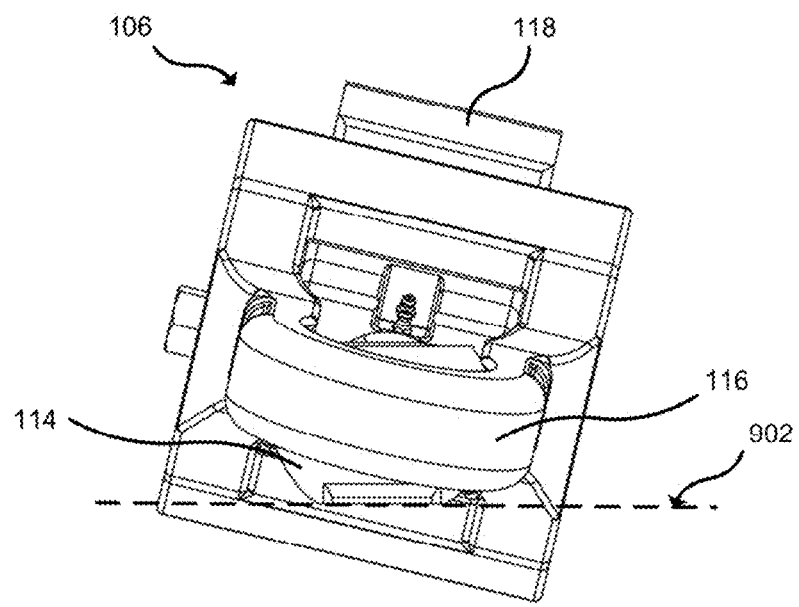
FIGS. 9A and 9B depict the tilting movement of the hitch.
Figure 9B:
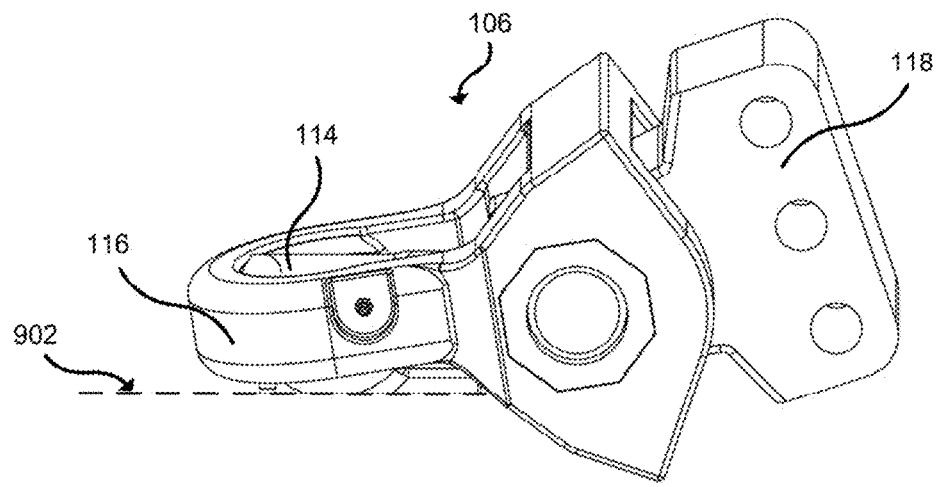

FIGS. 9A and 9B depict the titling or rolling articulation the hitch. FIG. 9A depicts a front view of the hitch 106 tilted or rolled in a clockwise direction and FIG. 9B depicts a side view of the hitch 106 of FIG. 9A. As described above, the high articulating hitch provides high articulation for vertical movement. The spherical insert also articulates for rolling movement of the towed implement. To accommodate the tilting or rolling movement of the implement 104, the spherical internal raceway of the C-shaped section of the tongue 116 may rotate about the spherical segment of the insert 114. The insert 114 rests on the drawbar (depicted as dashed line 902) and is secured in position by the draw pin (not shown). While the spherical bearing connection between the insert 114 and tongue 116 allows for both vertical and rolling/tilting articulation, the range of motion for rotation about a vertical axis may be limited as a result of the insert's protrusion extending between the walls of the tongue. However, the insert can freely rotate around the draw pin to provide articulation about the vertical axis. The spherical connection provides articulation of the hitch for rolling/tilting motion of the implement. As described further below, additional articulation for rolling/tilting motion can be provided by adapting the back section of the articulating tongue base.

Figure 10A:
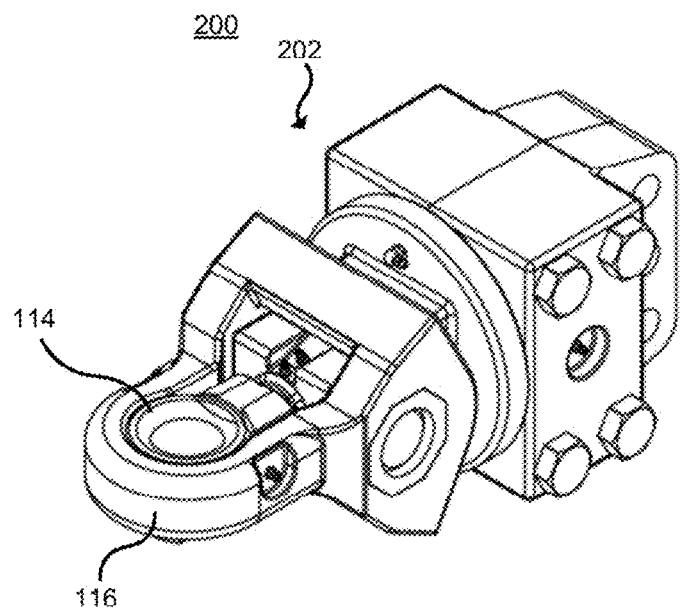
FIG. 10A depicts an assembled embodiment of the hitch.
Figure 10B:
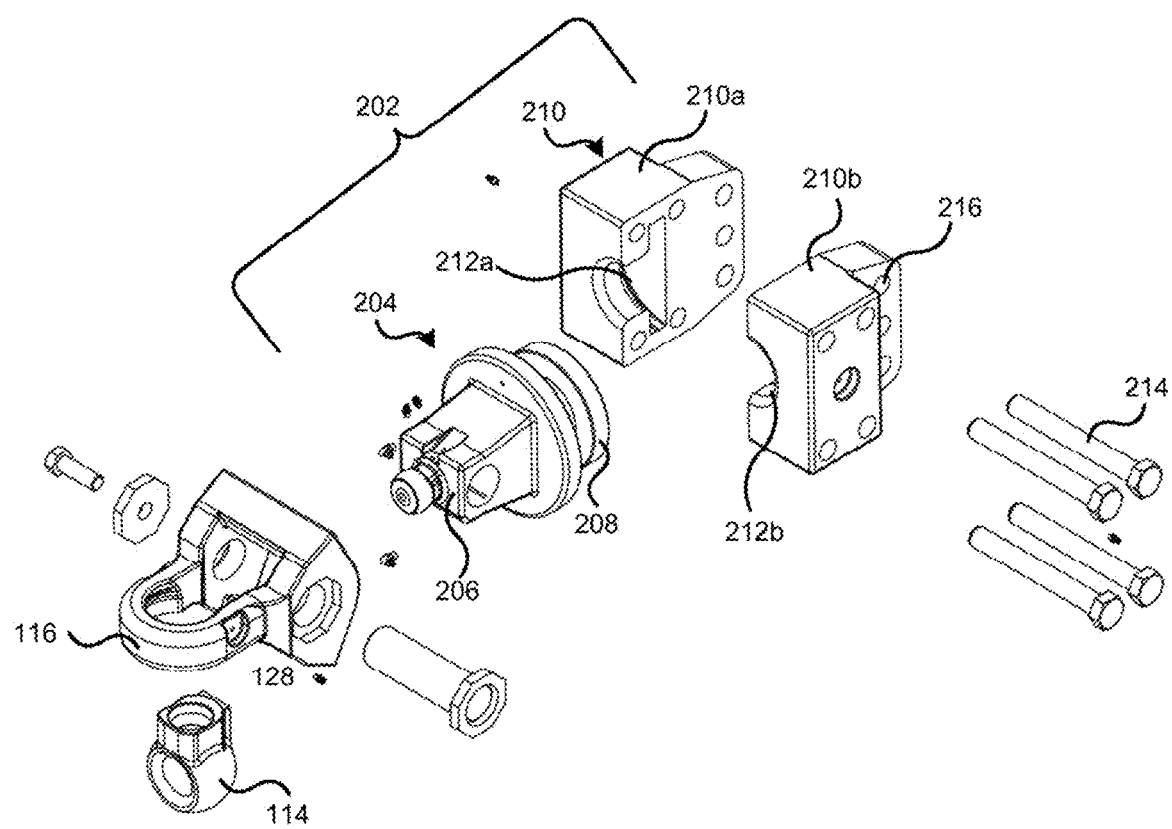
FIG. 10B depicts an exploded view of the components of the embodiment of the hitch.

FIG. 10A depicts a further embodiment of a high articulation hitch. FIG. 10B depicts an exploded view of the components of the hitch of FIG. 10A. The hitch 200 is similar to the hitch 106 described above and as such only the differences are discussed further herein. The hitch 200 comprises an insert 114 and tongue 116 that are both connected to an articulating tongue base 202 in a similar manner as described above with respect to the articulating tongue base 118. However, rather than being adapted for direct connection to the towed implement, the rear section of the articulating tongue base is adapted for connection to the towed implement via a rotating assembly.

The articulating tongue base 202 comprises a first base component 204 having a front section 206 with a ball for connecting to the insert as well as a through-hole for a pivot connection. The rear section 208 of the first base component 204 is adapted for coupling to the towed implement via a rotating connection. The back of the first base component comprises an enlarged circular head and a reduced diameter connection. A second base component 210 is secured over the circular head and allows the second base component 210 to rotate about the enlarged circular head. The second base component is depicted as being provided by two separate sections 210a, 210b that include semi-circular recesses 212a, 212b that capture the enlarged circular head when assembled. The sections 210a, 210b of the base component can be secured together by one or more bolts 214. The second base component 210 includes a back section that is adapted for connecting to the towed implement, for example by one or more bolt holes 216. The second base component 210, when secured to the first base component 204, is free to rotate about the enlarged circular head providing unlimited range of articulation for rolling/tilting of the towed implement. Grease fittings may be provided for supplying grease or lubricant to moving surfaces.

Embodiments of a hitch that provides high articulation for vertical movement have been described above. The hitches comprise an articulating tongue section that is coupled to both a tongue and an insert that is received within the tongue. The connections allow greater vertical articulation between the towed implement and the tow vehicle while still transferring the vertical load of the implement to the drawbar of the tow vehicle.

Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A hitch, comprising:
    a tongue having an opening through which a draw pin can pass;
    an insert received within the tongue, the insert having a through-hole for receiving the draw pin passing through the opening of the tongue and a corresponding hole in a drawbar of a tow vehicle in order to secure the hitch to the drawbar of the tow vehicle when in use; and
    a base with an implement connection, the base pivotally coupled to the tongue by a pivot pin located between the implement connection and the through-hole of the insert and moveably coupled to the insert.

2. The hitch of claim 1, wherein the tongue comprises:
    a section having an internal spherical raceway; and
    opposing walls each extending from opposite sides of the section.

3. The hitch of claim 2, wherein the section of the tongue is C-shaped and the opposing walls extend from opposite arms of the C-shape.

4. The hitch of claim 2, wherein the insert comprises:
    a spherical segment received within the internal spherical raceway of the tongue; and
    a projection extending rearward between the opposing sides of the section and having a socket recess.

5. The hitch of claim 4, wherein the base comprises:
    a ball located in front of the pivotal connection to the tongue, the ball being received within the socket recess of the insert; and
    a back end being adapted for connection to a towing implement.

6. The hitch of claim 5, wherein at least a portion of the ball remains in contact with at least a portion of the socket recess throughout movement of the base relative to the tongue.

7. The hitch of claim 6, wherein the socket recess has a generally hemi-spherical shape.

8. The hitch of claim 7, wherein a middle portion of a bottom surface of the hemi-spherical socket recess is raised and has a flat top.

9. The hitch of claim 5, wherein the base is pivotally connected through the opposing walls via a pin.

10. The hitch of claim 9, wherein the pin is slidingly received by an opening in each of the opposing walls.

11. The hitch of claim 10, wherein the pin is secured at a side of each of the opposing walls.

12. The hitch of claim 1, wherein the implement connection of the base comprises one or more bolt holes.

13. The hitch of claim 1, wherein the implement connection of the base comprises a rotatable connection.

14. The hitch of claim 13, wherein the rotatable connection comprises a circular projection at a back end of the base and at least two clamp sections secured about the circular projection, the at least two clamp sections when secured about the circular projection having a back end comprising one or more bolt holes for connecting the towing implement.

15. The hitch of claim 14, wherein the at least two clamp sections are secured together with bolts.

16. The hitch of claim 1, wherein the through hole of the insert is sized to slidingly receive the draw pin for connecting the hitch to the drawbar.

17. The hitch of claim 1, wherein when in use, the insert rests on the draw bar of the tow vehicle and a force of the towing implement is transferred to the drawbar through the moveable coupling between the base and the insert.

18. The hitch of claim 1, further comprising a plurality of grease connections arranged to supply lubricant to movable connections.

19. A towing implement comprising:
    a frame;
    a working component coupled to the frame; and
    a hitch apparatus according to claim 1 connected to the frame for connecting the towing implement to a tow vehicle.

* * * * *